J. B. Savage,
Wrench.
No. 62,291. Patented Feb. 19, 1867.

Witnesses:
John H. Shumway
A. J. Tibbits

Inventor:
J. B. Savage
By his Atty
John E. Earle

United States Patent Office.

JULIUS B. SAVAGE, OF SOUTHINGTON, CONNECTICUT.

Letters Patent No. 62,291, dated February 19, 1867.

IMPROVEMENT IN WRENCH.

The Schedule referred to in these Letters Patent and making part of the same.

TO ALL WHOM IT MAY CONCERN:

Be it known that I, JULIUS B. SAVAGE, of Southington, in the county of Hartford, and State of Connecticut, have invented a new Improvement in Wrenches; and I do hereby declare the following, when taken in connection with the accompanying drawings and the letters of reference marked thereon, to be a full, clear, and exact description of the same, and which said drawings constitute part of this specification, and represent, in—

Figure 1:
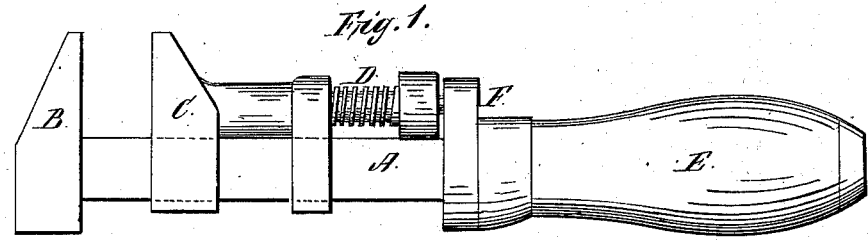
Figure 2:
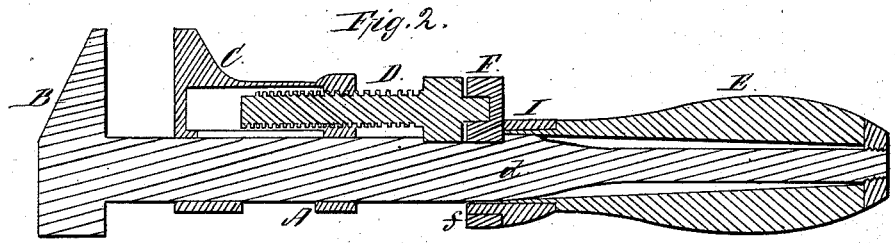

Figure 1, a side view.
Figure 2, a longitudinal section; and in
Figures 3, 4, and 5, detached views.

My invention relates to an improvement in the construction of a common "monkey wrench," and consists in the peculiar manner of constructing and securing the collar which supports the lower end of the adjusting-screw.

To enable others skilled in the art to construct and use my improvement, I will proceed to describe the same as illustrated in the accompanying drawings.

Figures 3, 4, 5:
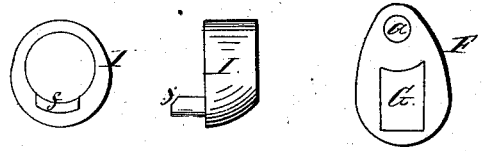

A is the bar; B the jaw fixed thereto; C the movable jaw; D the adjusting-screw; and E the handle, all of common and well-known construction. F, the collar which supports the lower end of the adjusting-screw, has heretofore been formed on the bar itself, or secured thereto by a thread and nut. The first construction is objectionable in that the great strain which comes upon the collar by use of the wrench bends the collar so as to greatly increase the friction upon the screw. To the last-named construction the cost of manufacture is sufficient objection to make it impracticable. The collar F, I form as seen in figs. 2 and 5, $a$ being the seat to receive and hold the lower end of the screw. I form a mortise, G, through which the bar passes, and so that when in its position upon the bar, as seen in fig. 2, the said collar drops on to a shoulder, $d$, on the bar, leaving an open space in the mortise upon the back side of the bar. I is the ferrule which is formed with a projecting tongue, $f$, corresponding to the opening in the mortise back of the bar, and so that when placed in position, as seen in fig. 2, the tongue $f$ enters and fills the said space; the handle is then placed upon the bar, as seen in fig. 2, firmly holding the ferrule in its place, and supporting the collar F firmly in its position; thus the tongue $f$ forms a key, which binds the collar firmly to the bar. The collar and ferrule are both formed in malleable iron or similar metal, and thus are very cheap, and not liable to get out of repair.

Having therefore thus fully described my invention, what I claim as new and useful, and desire to secure by Letters Patent, is—

The collar F, and ferrule I, provided with a tongue, $f$, with the bar A, when constructed and combined to secure the collar to the bar substantially as herein set forth.

J. B. SAVAGE.

Witnesses:
JOHN E. EARLE,
A. J. TIBBITS.